March 13, 1956

H. A. GREENWALD 2,737,938

ENGINE STARTING MECHANISM

Filed Oct. 30, 1950

INVENTOR,
Harold A. Greenwald
BY

ATTORNEY

March 13, 1956 H. A. GREENWALD 2,737,938
ENGINE STARTING MECHANISM
Filed Oct. 30, 1950 4 Sheets-Sheet 2

*INVENTOR,*
Harold A. Greenwald
BY
ATTORNEY

March 13, 1956 H. A. GREENWALD 2,737,938
ENGINE STARTING MECHANISM
Filed Oct. 30, 1950 4 Sheets-Sheet 3
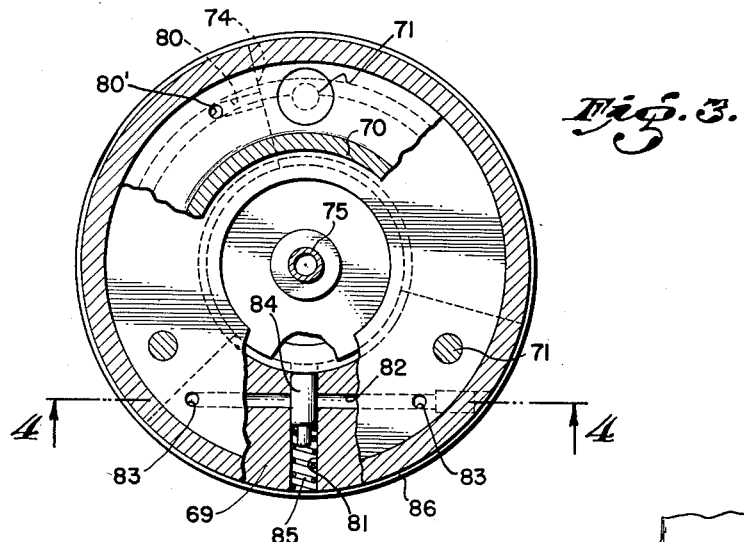
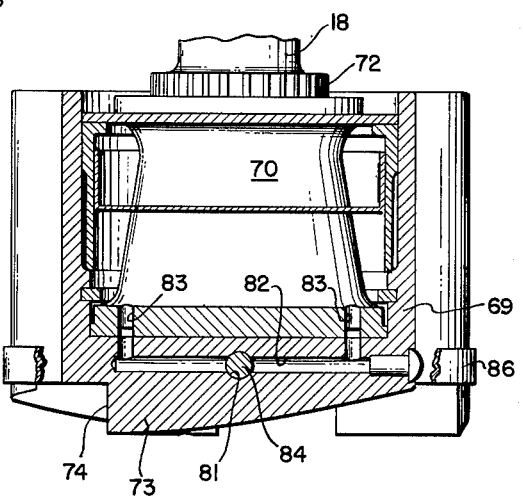
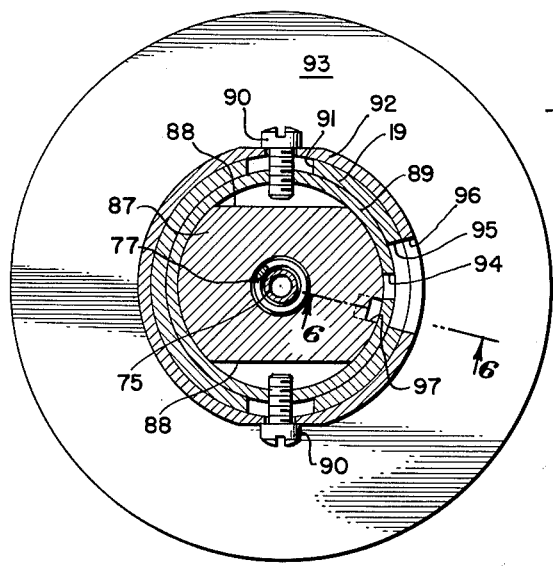
INVENTOR,
Harold A. Greenwald
BY
ATTORNEY March 13, 1956  H. A. GREENWALD  2,737,938
ENGINE STARTING MECHANISM
Filed Oct. 30, 1950  4 Sheets-Sheet 4
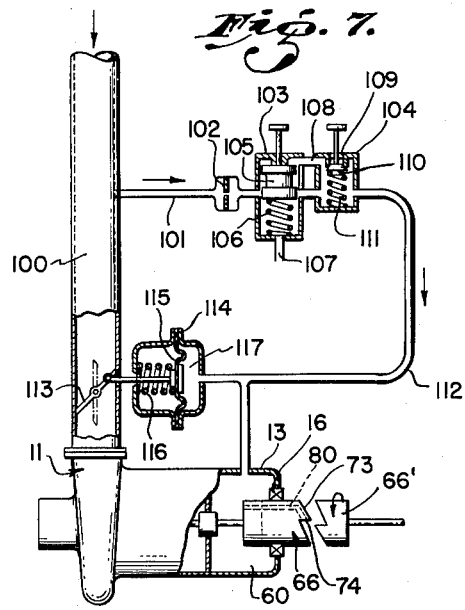
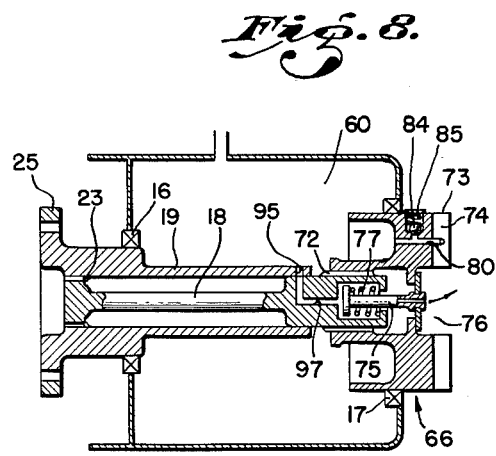
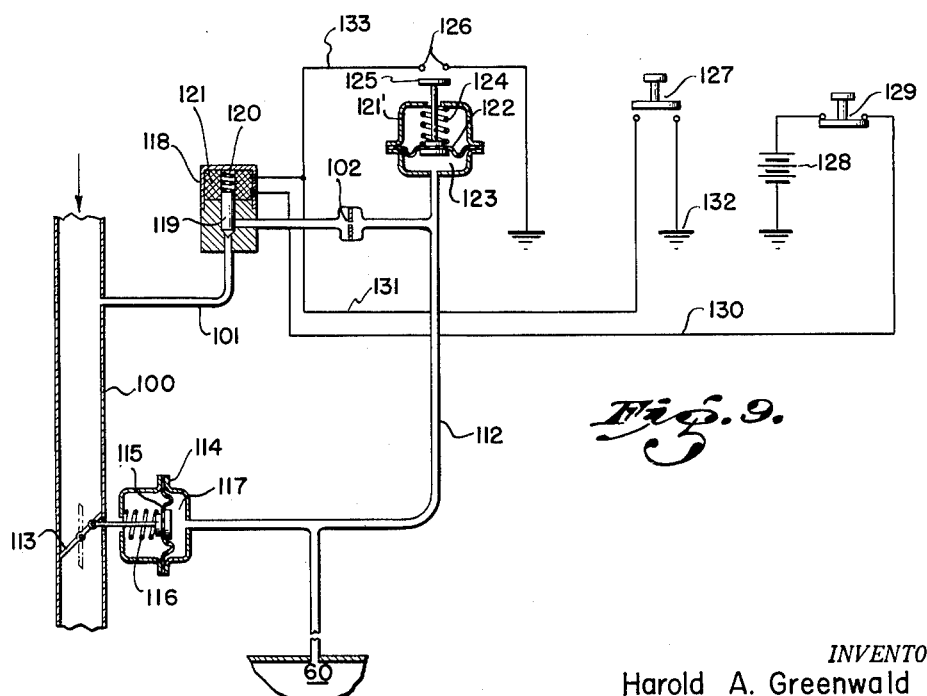
INVENTOR,
Harold A. Greenwald
BY
ATTORNEY

United States Patent Office 2,737,938
Patented Mar. 13, 1956

2,737,938

ENGINE STARTING MECHANISM

Harold A. Greenwald, Los Angeles, Calif., assignor to The Garrett Corporation, Los Angeles, Calif., a corporation of California Application October 30, 1950, Serial No. 192,952

9 Claims. (Cl. 123—179)

The present invention relates generally to mechanism for initially rotating a prime mover or other power means, such as an engine, during starting, and is more particularly concerned with mechanisms for such purpose, which are susceptible of use with engines having relatively high speed characteristics.

The present invention, although susceptible of general application, is particularly suited for use in the starting of aircraft engines, and possesses inherent advantages over the well-known mechanical type of starter as heretofore utilized for the starting of automobile engines. In the main, such mechanical types utilize in one form or another a clutch having inertia or depending upon friction, and which is dependent upon rotation of the clutch parts, before it will be moved into clutched connection with the prime mover starting shaft.

These prior art devices were designed for comparatively low speeds of rotation and with little or no regard for weight considerations. Moreover, complexity of design did not present a serious problem, since failure of the starter mechanism in a land vehicle such as an automobile, did not immobilize it. On the other hand, the relatively high speed prime movers of aircraft did not lend themselves to satisfactory starting by the commonly known types of mechanical starters, and required a starting mechanism which would be reliable over long periods of operation, of light weight, and of simple construction. Failure of the starting mechanism in an aircraft might well be fatal to its continued operation.

With the foregoing problems in mind, it is one object of the present invention to provide an engine starting mechanism or unit of simple, light weight, but rugged construction, and which is more reliable than currently available devices for use with aircraft engines or prime movers.

A further object is to provide in a starting mechanism, improved clutch means so designed as to have positive substantially shockless engagement, and which is not dependent upon inertia or rotation of the clutch parts in order to engage the clutch.

A further object is to provide an engine starting mechanism utilizing pneumatically actuated power means combined with a pneumatically actuated clutch, wherein energization of the power means and clutch may be initially accomplished at a time when the clutch parts have not as yet started to rotate, or have just begun to rotate, so that the clutching may take place substantially without shock and provide a positive clutch engagement without subjecting the parts to relatively high stresses of operation.

A still further object is to provide an engine starting mechanism having novel means associated with the clutch parts, for deenergizing both the power means and the clutch, whereby the latter becomes disengaged, such means being controlled in response to relative rotational movement between the clutch parts, such, for example, as will result when the engine being started overruns the speed of the starter.

Still another object is to provide in an engine starting mechanism, means for protecting the mechanism against excessive torque and over-speed conditions.

Further objects of the invention will be brought out in the following part of the specification, wherein detailed description is for the purpose of fully disclosing the invention without placing limitations thereon.

Referring to the accompanying drawings, which are for illustrative purposes only:

Fig. 3 is a transverse sectional view through the clutch means, taken substantially on line 3—3 of Fig. 1;

Fig. 4 is a partial sectional view, taken substantially on line 4—4 of Fig. 3;

Fig. 5 is a transverse sectional view through a portion of the torque limiting means, taken substantially on line 5—5 of Fig. 1;

Fig. 7 is a view schematically illustrating the engine starting mechanism of the present invention, and associated pneumatic control therefor;

Fig. 8 is a view showing schematically certain protective features of the mechanism; and Fig. 9 is a view schematically illustrating one form of electrical control for the engine starting mechanism of the present invention.

Figure 1:
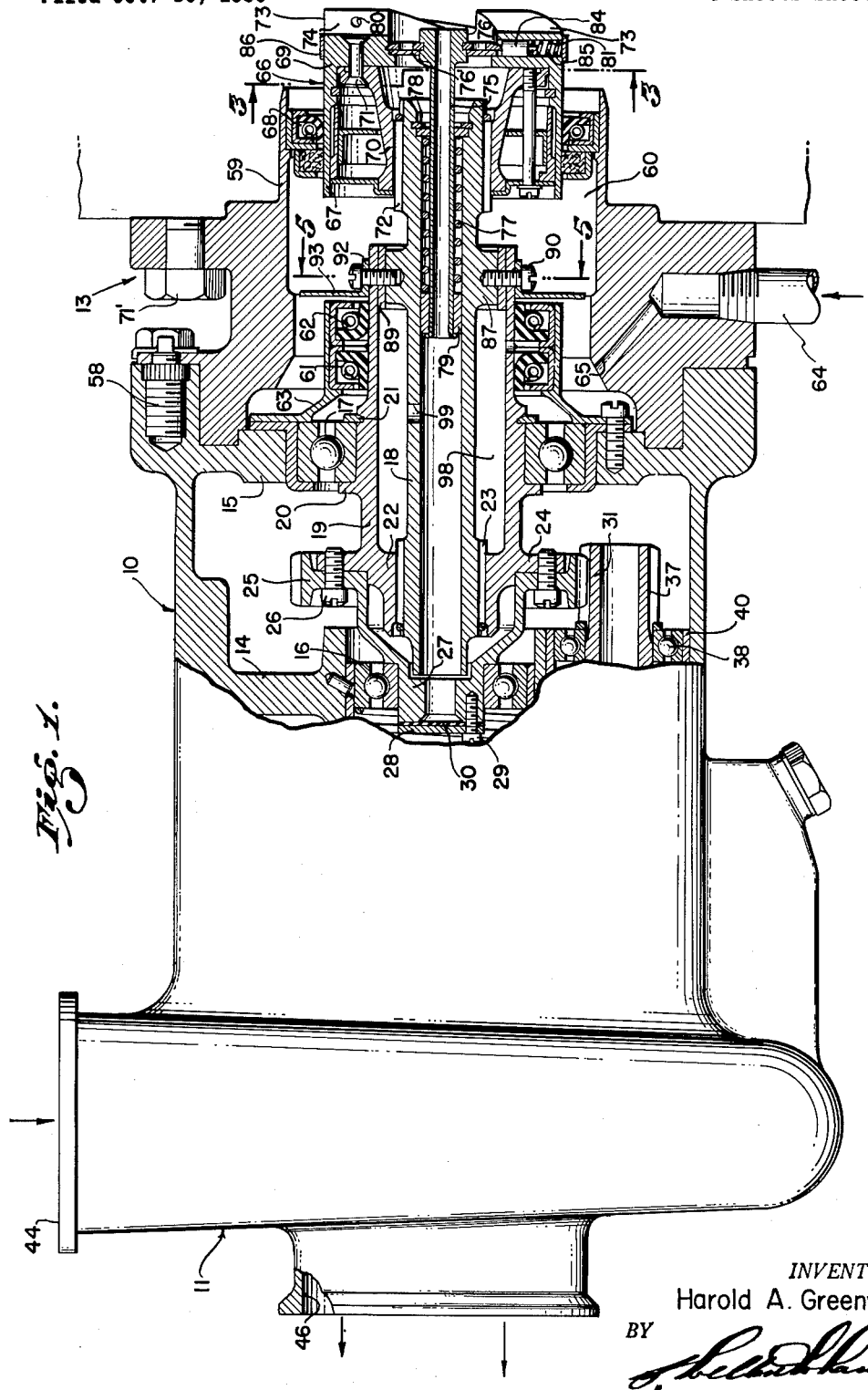
Fig. 1 is a longitudinal vertical sectional view of an engine starter embodying the features of the present invention, and showing the manner of attachment to the engine with which it is associated.

Referring more specifically to the drawings, there is shown in Fig. 1 for illustrative purposes, a prime mover or engine starting mechanism constructed according to the present invention. In general, the starting mechanism is in the form of an attachment which may be mounted on a supporting part of the prime mover or engine with which it is to be associated, and is arranged for operation to initially start or turn over the prime mover during starting, and then be automatically disconnected from the prime mover after the latter is operating normally and has exceeded the speed of the starter.

The starting mechanism is contained within a housing composed of a plurality of interconnected casing sections. More specifically, the housing comprises an intermediate gear casing 10, a turbine end casing 11 which is connected in spaced relation to one end of the gear casing, and a clutch end casing 13 connected to the other end of the gear casing.

The gear casing 10 houses means for transmitting the higher speed of the turbine through a speed reducing transmission. The gear casing is internally provided with axially spaced wall structures 14 and 15 which support anti-friction bearings 16 and 17, respectively. These bearings rotatably support a power delivery shaft assembly consisting of an inner tubular shaft 18 and outer cylindrical shaft 19 in concentric relation, the latter intermediate its ends having the inner race of bearing 17 anchored thereto between a circumferentially extending flange 20 and retaining ring 21. The outer shaft 19 has a reduced end 22 which connects with the adjacent portion of shaft 18 through a spline connection 23.

This end of shaft 19 is also provided with an outer flange 24 to which a driven gear 25 is connected by means of a plurality of securing screws 26. The gear 25 has a dished hub portion which is laterally offset so as to form a cap for this end of the shafts 18 and 19, and provide a central tubular projecting portion 27 upon which the inner race of the bearing 16 is seated. The outer end of the portion 27 is closed by a sealing plate 28 secured by a retaining screw 29 against a sealing gasket 30.

The wall structure 14 also forms a support for one or more countershaft assemblies, each of which comprises a countershaft 31 having a driving connection at one end with the turbine and at its opposite end being provided with gear teeth 37 for meshing engagement with the teeth of the driven gear 25.

This countershaft assembly is rotatably supported in a suitable bearing structure which includes an antifriction bearing 38, the outer race of this bearing being mounted in a carrier 40 and the inner race being suitably anchored on the countershaft 31.

Figure 2:
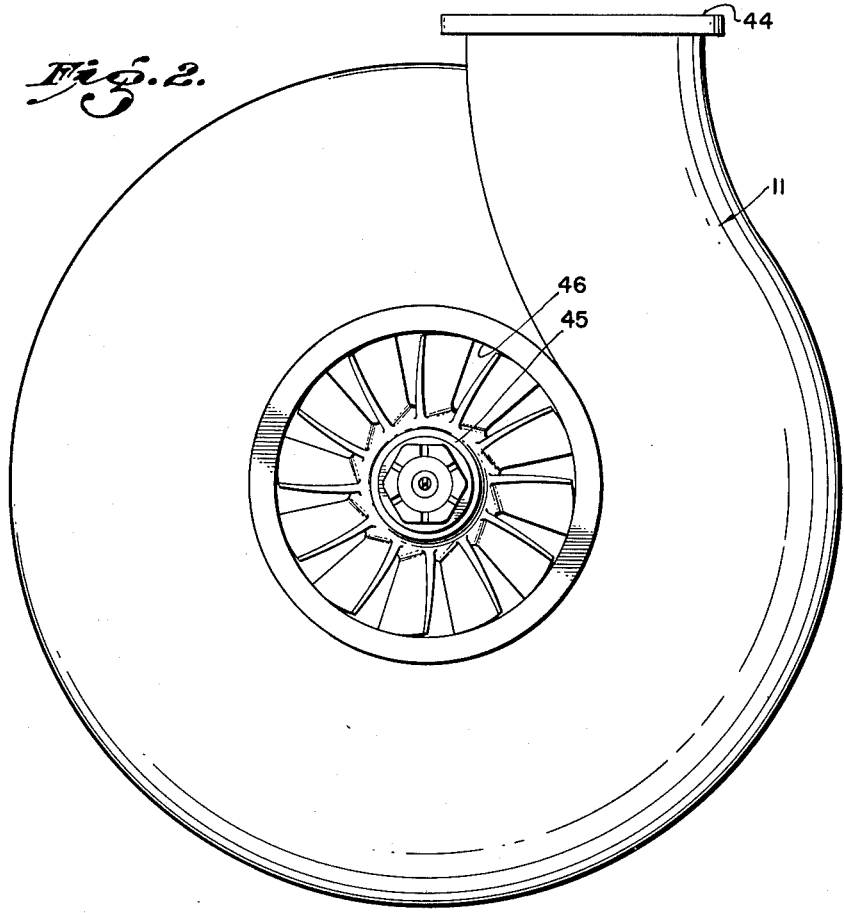
Fig. 2 is an end view of the same, looking at the turbine end.

The turbine end casing 11 is provided with a fluid pressure inlet 44 and houses suitable fluid directing means for actuating a turbine rotor 45 and guiding the fluid so as to be discharged axially from a discharge opening 46, as shown in Fig. 2.

The structure thus far described relates generally to the means for providing starting power by means of a suitable relatively high-speed turbine, and by means of a speed reducing transmission to deliver this power to a relatively slower rotating delivery shaft assembly for utilization in starting a prime mover or engine with which the starting mechanism is associated.

The clutch mechanism will now be described in detail. This mechanism is housed within the clutch end casing 13 which is secured to the opposite end of the gear casing 10 from that to which the turbine is connected, the connection between the clutch end casing and gear casing being accomplished by means of a plurality of securing screws or bolts 58.

The clutch end casing is of generally cylindrical construction and has a relatively thin-walled extension at its outer end, as indicated at 59. The clutch end casing surrounds the adjacent end of the driving shaft assembly and forms a fluid pressure chamber 60 which is sealed with respect to the gear casing by means of sealing ring assemblies 61 and 62 which engage the outer surface of cylindrical shaft 19 and are supported from a retainer bracket 63 mounted on the wall structure 15. Fluid pressure is admitted to the chamber 60 from a supply source through a conduit 64 and connecting flow passage 65. The fluid pressure within the chamber 60 acts on a cupped-shaped piston assembly 66 which is supported for axial movement within the extension 59, the piston assembly having a cylindrical wall 67 which is sealed with respect to the extension 59 by a circumferentially extending sealing ring assembly 68.

The piston assembly has an annular end wall 69 which is secured on its inner face to a cylindrical hub member 70 by means of suitable rivets 71. The hub 70 has a spline connection 72 with the adjacent end of the inner tubular shaft 18 so as to support the piston assembly for axial shifting movements. The other face of the end wall 69 is provided with a plurality of radially extending clutch teeth 73 having engagement faces 74 adapted to engage similar faces on a mating clutch member carried by the shaft of a prime mover or engine to which the starter of the present invention may be connected as by securing or mounting bolts 74'.

A tubular member 75 is reciprocably mounted within the adjacent end of the inner tubular shaft 18, the outer end of this member being centrally supported within a central opening 76 in the end wall 69 by an annular cover plate 76'. An expansion spring 77 surrounds the tubular member 75 within the tubular shaft 18, one end of this spring bearing against a stop 78 carried by the shaft 18, and the other end of this spring engaging against an end collar 79 surrounding the inner end of tubular member 75. The action of the spring 77 is to normally bias the piston assembly movement in an inward direction such that the clutch teeth 73 will be disengaged or unclutched.

Movement of the clutch assembly in an opposite direction or toward clutched position is accomplished by building up fluid pressure within the fluid pressure chamber 60, this pressure acting against the biasing action of expansion spring 77. It will therefore be apparent that upon decrease of fluid pressure, for any reason, the biasing spring will be permitted to act and then disengage the clutch teeth. Advantage is taken of this operating characteristic to provide several protective features which will now be described.

Provision is made for automatically disconnecting the starter unit whenever the speed of the prime mover or engine exceeds that of the clutch teeth 73 so as to cause separation of the clutch teeth in a circumferential direction by relative separating movements thereof. There is provided in one of the clutch tooth faces 74, a surface opening passage 80 which has an inner end 80', as shown in Fig. 3, communicating with the fluid pressure chamber 60. Normally, the opening in the face 74 will be closed during clutch tooth engagement. However, as soon as the tooth 73 and the tooth with which it engages are separated, the passage 80 will be opened to permit bleeding of pressure fluid from the chamber 60 with the result that the decreased pressure in this chamber will initiate shutting operation of the control and permit actuation of the clutch to unclutched position under the influence of spring 77. The starting device is thus automatically disconnected from the prime mover as soon as the prime mover starts and begins picking up speed.

Provision is also made for automatically disengaging the clutch and shutting down the starter through control means which will be subsequently described in detail.

As shown in Figs. 1, 3 and 4, the end wall 69 is provided with a radially extending passage 81 which communicates at its inner end with atmosphere. The passage 81 is intercepted by a transverse passage 82, the ends of which connect through end passage openings 83—83 with the fluid pressure chamber 60. A valve member 84 is normally biased toward the inner end of passage 81 by an expansion spring 85, the valve member in this position closing fluid flow between the passage 81 and transverse passage 82. The outer end of spring 85 bears against a retaining circumferentially extending ring 86 around the periphery of the end wall 69. With this arrangement it will be apparent that the valve member 84 may be designed as to weight, and the spring 85 designed accordingly to permit outward movement of the valve member under the action of centrifugal force sufficiently to permit fluid flow between passage 82 and the innermost end of passage 81, whereupon fluid pressure within the chamber 60 will be reduced and cause disengagement of the clutch. The force acting to move the valve outwardly varies as the square of the speed and the radius of the valve's center of gravity. The opposing force of spring 85 has a linear characteristic with a spring rate designed to result in a snap action opening of the valve upon exceeding the designed speed.

Provision is also made for disconnecting the clutch and shutting down the starter whenever the torque imposed upon the starting turbine exceeds a predetermined and adjustable value.

Referring to Fig. 1, it will be appreciated that due to the longitudinal spacing on the tubular shaft between the spline connection 23 and the spline connection 72 the load imposed will cause a twisting of the shaft between the spline connections. This twisting is utilized to actuate a valve for bleeding the pressure chamber 60 upon the occurrence of a predetermined torque load.

Figure 6:
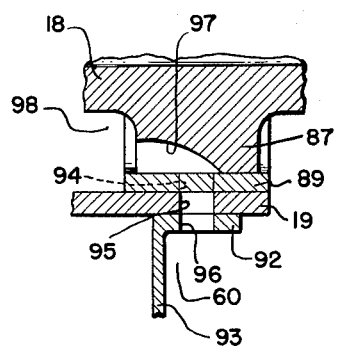
Fig. 6 is a fragmentary sectional view, enlarged to show additional details of the torque limiting means, taken substantially on line 6—6 of Fig. 5.

As shown in Figs. 1, 5 and 6, the shaft 18, intermediate its spline connections is enlarged to form a circumferentially extending flange 87. This flange is provided with surface opening grooves 88—88 which are diametrically opposed. A ring 89 surrounds the flange 87 and is positioned between this flange and the adjacent surrounding wall of the outer cylindrical shaft 19. The ring 89 is circumferentially adjustable and is secured in desired adjusted position by means of radially extending screws 90—90 which extend through slots 91 of the shaft 19 and threadably engage the ring 89. The inner ends of these screws extend into the associated grooves 88 so that twisting movement of the flange may occur. The heads of the screws 90 bear against a flange 92 of oil slinger 93, the flange 92 cooperating with the ring 89 to clampingly engage the wall of shaft 19 therebetween.

As shown in Fig. 5, the ring 89 is provided with an opening 94 which registers with and is adjustably positionable longitudinally thereof in elongate slots 95 and 96 in the shaft 19 and flange 92 respectively.

As shown in Fig. 6, the flange 87 has a transversely extending groove 97 which communicates at one end with a space 98 lying between the shafts 18 and 19. The other end of the groove 97 is normally closed by the ring 89, as shown in Fig. 5. However, as torque load on the starting unit increases, twisting of the shaft 18 will act to move the groove 97 to such position that communication will be established with the opening 94, at a predetermined value, depending upon the adjustment of the ring 89.

As shown in Fig. 1, the space 98 between shafts 18 and 19, is connected through a port passage 99 with the interior of inner tubular shaft 18 from whence any fluid bled from the pressure chamber 60 may escape to atmosphere through the bore of tubular member 75.

The starter unit may be arranged for push button control which may be strictly pneumatic, or a combination of electro-pneumatic devices.

In Fig. 7, one form of pneumatic control is shown for illustrative purposes. In this arrangement, the starter unit is connected through a supply duct 100 with any suitable source of supply of compressed air. Control air is conducted from the duct 100 through a connecting conduit 101 and restricted orifice 102 into interconnected manual control valves 103 and 104.

The control valve 103 has a balanced piston valve member 105 which is normally biased to raised position by a spring 106. In this raised position, the piston valve member cuts off fluid flow to the control valve 104 and the control system. The valve 103, below the piston valve member 105, is vented to atmosphere through a vent opening 107. It will be noted that the valve member 105 does not completely seat at its upper end and is normally spaced away from the upper wall of the valve chamber. The space above the valve member 105 is connected by a conduit connection 108 with the interior of valve 104 so that when the valve member 105 is depressed to open position, fluid will flow into valve 104 and at the same time apply pressure above the valve member 105 to hold the valve open against the pressure of spring 106 as soon as the holding pressure builds up as hereinafter to be described. It will be apparent that so long as the valve member 105 is open, fluid pressure will be supplied through a supply conduit 112 to a pneumatically controlled valve 113 and to the chamber 60 of the starter unit.

Valve 104 is provided at its upper end with an outlet opening 109, this opening being normally closed by a valve member 110 under the action of a spring 111. When the valve member 110 is depressed, the pressure acting upon the top of piston valve 105 is relieved through the outlet opening 109, thus permitting the piston valve 105 to close under the action of spring 106.

The valve 113 is actuated by a pneumatic actuator 114 containing a movable wall or a diaphragm 115 which is acted upon one side by a spring 116 and the opposite side by fluid pressure in pressure chamber 117. The diaphragm is mechanically connected through suitable linkage with the valve 113 in the duct 100.

The operation of the above described control, as schematically illustrated in Figs. 7 and 8, will now be explained:

As air is admitted to conduit 112 by manually opening valve 103, pressure will build up in the pressure chamber 117 of the actuator 114, and in the fluid pressure chamber 60 of the starter unit. The fluid pressure in the chamber 60 acts on the piston assembly 66, forcing it outwardly against the pressure of spring 77 and into engagement with a mating clutch assembly 66′ connected with the prime mover which is to be started. Substantially simultaneously with this action the pressure in pressure chamber 117 acts on the valve 113 and moves it to initially slightly open position, thus allowing a limited flow of air to the turbine of the starter unit, the rotor of which begins to revolve.

As the clutch engages, the opening of passage 80 in the clutch face 74 will be closed. Pressure will then continue to build up in the control conduits so that the piston valve 105 will be held in open position, and the operator may remove his finger from the push button. This increased pressure in chamber 117 will actuate the valve 113 to fully opened position. The starter unit quickly comes to designed speed of operation, and the connected prime mover is started. In the event that the clutch fails to engage and a holding pressure does not develop above the valve member 105, removal of the operator's manually applied force will effect closing of the valve and shutting down of the starter unit, thus providing a most desirable safety feature.

As the prime mover begins to operate under its own power, its speed of operation soon exceeds that of the starter unit and the jaws of the clutch will begin to separate, thus opening up the passage 80, whereupon the pressure within the chamber 60 and connected control conduit will be bled to atmosphere and thus reduced. With this reduction in pressure the actuator 114 operates to start closing of the valve 113, and the piston valve in control valve 103 is permitted to raise and shut off the air from the control system. With further drop in pressure the valve 113 is closed completely and the clutch piston assembly 66 is fully retracted; the starter thus coming to rest.

Should it become necessary during the starting cycle to shut down the starter unit, this may be done simply by depressing the valve member 110 of control valve 104 which will vent the control conduits to atmosphere and thus accomplish a shutting down operation as previously described.

The detailed operation of the overspeed and excessive torque mechanisms for venting the chamber 60 of the starter unit to atmosphere upon the occurrence of these conditions, has already been explained. Thus, venting of the chamber 60 due to overspeed or excessive torque will set up the same cycle of operations for shutting down the starter as in the case where the chamber 60 is vented through passage 80 due to overrunning speed of the prime mover. It is therefore thought unnecessary to explain the shutting down operations further in connection with the operation of these safety features.

Referring to Fig. 9, a modified control system is illustrated, this system being of the electro-pneumatic type. Associated devices which are similar to those utilized in the control system shown in Fig. 7, are identified by similar numerals.

In this control arrangement an electro-magnetic valve 118 is inserted in conduit 101 between its connection with duct 100, and the restricted orifice 102. This valve has a solenoid valve member 119 which is normally retained in closed position with respect to conduit 101 by a spring 120. Energization of its operating coil 121 acts to raise the valve member 119 so as to permit flow in the associated conduit 101.

The valves 103 and 104 which were previously described, have been eliminated, and a pressure responsive switch 121′ connected on the other side of the restricted orifice 102.

The switch 121′ contains a movable wall or diaphragm 122 which is acted upon one side by fluid pressure in a chamber 123 and on its other side by a spring 124, the diaphragm being connected with a bridging member 125 which is movable into closed and open relation with associated stationary contacts 126.

The coil 121 of the electro-magnetic valve 118 is energizable through a normally open starting push button 127. Closing of the contacts of the starting push button 127 connects the coil 121 with a source of electrical energy, in this case a battery 128, through the following circuit: from one side of the battery 128, through the contacts of a normally closed push button 129, through conductor 130 to one side of coil 121, from the other side of this coil through conductor 131, and thence through the contacts of push button switch 127 to ground 132, and thence back to the other side of the battery 128.

As soon as the solenoid valve member 119 moves to open position and pressure builds up in the chamber 123 of switch 121', the bridging contact 125 will connect contacts 126 to establish a holding circuit for the coil 121 from conductor 131, through branch conductor 133, the contacts 126, and thence to ground. As soon as this holding circuit is established, the push button switch 127 may be released.

The operation of starting and shutting down of the starter unit will be essentially the same as in connection with the previously described control, except, that the shutting down is normally accomplished by a decrease of pressure in the chamber 123 of the pneumatically controlled switch 121', which will act to open the holding circuit and permit closing of valve member 119.

In the case of emergency shut-downs, or contemplated manual shut-down, this is easily accomplished by opening the normally closed push button switch 129.

I claim:

1. Engine starting mechanism, comprising: fluid pressure actuated power means; a driving connection with said power means including a clutch normally biased towards open position; means for actuating said clutch to closed position including a pressure chamber having a vent passage; controlled flow passages respectively providing fluid pressure supply to said power means and to said chamber; means for varying the control of the flow passage to said power means in accordance with variations of fluid pressure in said chamber and the flow passage thereto; and means normally closing said vent operable to open said vent in response to an increased torque load on said power means above a predetermined value.

2. Engine starting mechanism, comprising: fluid pressure actuated power means; a driving connection with said power means including a clutch normally biased towards open position; means for actuating said clutch to closed position including a pressure chamber having a vent passage; controlled flow passages respectively providing fluid pressure supply to said power means and to said chamber; means for varying the control of the flow passage to said power means in accordance with variations of fluid pressure in said chamber and the flow passage thereto; and means normally closing said vent operable to open said vent in response to the occurrence of a predetermined driving condition on said power means.

3. Engine starting mechanism, comprising: fluid pressure actuated power means connected to a supply duct; a driving connection with said power means including a clutch; means biasing said clutch to disengaged position; means for actuating said clutch to engaged position including a pressure chamber having a venting passage controlled by the engaging and disengaging of said clutch; a fluid pressure actuated supply valve in said duct; a connection for supplying an operating fluid pressure to said supply valve and said chamber; a normally closed electromagnetically actuated control valve in said fluid pressure connection having a control circuit; means for normally closing said control circuit to actuate said control valve to open positions; fluid pressure actuated contacts operable to closed position in response to the opening of said control valve for energizing a holding circuit of said control valve; and normally closed contacts in said holding circuit, said contacts in open position deenergizing said holding circuit.

4. Engine starting mechanism, comprising: fluid pressure actuated power means connected to a supply duct; a driving connection with said power means including a clutch; means biasing said clutch to disengaged position; means for actuating said clutch to engaged position including a pressure chamber having a venting passage controlled by the engaging and disengaging of said clutch; a supply valve in said duct including a fluid pressure operated actuator; a connection for supplying an operating fluid under pressure to said actuator and said chamber; a normally closed control valve in said fluid connection; means for holding said control valve in actuated open position; and means for releasing said holding means for return of said control valve to normally closed position.

5. Engine starter mechanism, comprising: power means; clutch means having parts operable to clutched and unclutched positions to connect and disconnect said power means with respect to said engine; means normally biasing said parts toward unclutched position; first means actuated by fluid pressure for controlling said power means; second means actuated by fluid pressure for motivating said parts toward clutched relation; a source of fluid pressure connected to said first and second means; and means for reducing the fluid pressure acting on said first and second means, upon over-running speed of said engine, so as to enable movement of said parts to unclutched position by said biasing means and deenergization of said power means.

6. Engine starter mechanism, comprising: power means; clutch means having parts operable to clutched and unclutched positions to connect and disconnect said power means with respect to said engine; means normally biasing said parts toward unclutched position; first means actuated by fluid pressure for controlling said power means; second means actuated by fluid pressure for motivating said parts toward clutched relation; a source of fluid pressure connected to said first and second means; and means for reducing the fluid pressure acting on said first and second means in response to over-speed of said power means so as to enable movement of said parts to unclutched position by said biasing means and deenergization of said power means.

7. Engine starter mechanism, comprising: power means; clutch means having parts operable to clutched and unclutched positions to connect and disconnect said power means with respect to said engine; means normally biasing said parts toward unclutched position; first means actuated by fluid pressure for controlling said power means; second means actuated by fluid pressure for motivating said parts toward clutched relation; a source of fluid pressure connected to said first and second means; and means for reducing the fluid pressure acting on said first and second means in response to predetermined load torque on said power means so as to enable movement of said parts to unclutched position by said biasing means and deenergization of said power means.

8. Engine starter mechanism, comprising: power means; clutch means having parts operable to clutched and unclutched positions to connect and disconnect said power means with respect to said engine; means normally biasing said parts toward unclutched position; first means actuated by fluid pressure for controlling said power means; second means actuated by fluid pressure for motivating said parts toward clutched relation; a source of fluid pressure connected to said first and second means; and means responsive to clutched engagement of said parts for increasing the pressure acting on said first means, thereby augmenting energization of said power means so as to increase its speed.

9. Engine starting mechanism, comprising: fluid pressure actuated power means; a driving connection with said power means including a clutch; means for actuating said clutch to disengaged and engaged positions including a pressure chamber having a vent passage; means normally controlling fluid pressure supply to said power means and said chamber for energizing the same; and auxiliary control means normally closing said vent operable to open said vent in response to an increased speed of said power means above a predetermined value.

References Cited in the file of this patent

UNITED STATES PATENTS

| | | |
|---|---|---|
| 2,206,723 | Graham et al. | July 2, 1940 |
| 2,297,480 | Kratzman | Sept. 29, 1942 |
| 2,428,336 | Munschauer | Sept. 30, 1947 |
| 2,485,621 | McNairy | Oct. 25, 1949 |
| 2,506,663 | Guerin | May 9, 1950 |

FOREIGN PATENTS

| | | |
|---|---|---|
| 726,652 | Germany | Oct. 17, 1942 |